United States Patent [19]

Bethune

[11] 4,380,076

[45] Apr. 12, 1983

[54] APPARATUS FOR FOUR SIDE TRANSVERSE IRRADIATION OF A REGION

[75] Inventor: Donald S. Bethune, Mt. Kisco, N.Y.

[73] Assignee: International Business Machines Corporation, Armonk, N.Y.

[21] Appl. No.: 221,599

[22] Filed: Dec. 31, 1980

[51] Int. Cl.³ ............................................. H01S 3/091
[52] U.S. Cl. ..................................... 372/54; 350/299; 356/246; 372/72
[58] Field of Search ...................... 372/72, 70, 54, 79; 350/299, 286; 356/301, 318, 244, 246

[56] References Cited

U.S. PATENT DOCUMENTS 4,254,223  3/1981  Schuurs et al. ...................... 356/246
4,322,621  3/1982  Aagard ................................ 350/299

FOREIGN PATENT DOCUMENTS 2088757  12/1971  France .
909425  5/1961  United Kingdom .

Primary Examiner—James W. Davie
Attorney, Agent, or Firm—Ronald L. Drumheller

[57] ABSTRACT

A right angle corner reflector is used to reflect different parts of a single incident collimated radiation beam such that a cylindrical region is equally irradiated transversely from four directions. The cylindrical region is positioned such that rays which strike the intersection of the corner reflector surfaces are tangent to the side of the cylindrical region. The cylindrical region is spaced from the corner reflector such that one quarter of the radiation incident upon the cylindrical region strikes the region directly, one quarter is first reflected from one of the corner reflector surfaces, one quarter is first reflected from the other corner reflector surface, and one quarter is reflected from first one and then the other corner reflector surface before striking the cylindrical region.

9 Claims, 6 Drawing Figures

APPARATUS FOR FOUR SIDE TRANSVERSE IRRADIATION OF A REGION

DESCRIPTION

1. Technical Field

This invention relates to apparatus for uniformly irradiating a three-dimensional region and particularly to apparatus for transversely irradiating a cylindrical region simultaneously from many directions equally with a single source.

In the laser field there are situations where it is desired to pump an elongate (usually cylindrical) laser active medium from the side instead of from the end. This situation frequently arises, for example, with dye lasers. It is important, however, in transversely pumping a laser active medium that the cross-section of the active medium be as uniformly pumped as possible in order to enhance the basic mode of the laser. This generally requires that the active medium be transversely pumped simultaneously from more than one direction. Since dye cells are commonly pumped with radiation coming from another laser, it is particularly desirable to be able to transversely pump the active medium uniformly using only one pumping laser.

2. Background Art

Transverse pumping of lasers, including dye lasers, is known. In order to get a more uniform pumping of the laser active medium, transverse pumping is sometimes done from more than one direction. German Offenlegungsschrift Pat. No. 2646692, for example, illustrates a laser dye solution being pumped from two sides simultaneously. In U.S. Pat. No. 3,931,594, a laser dye solution is pumped from four sides simultaneously. Both of these patents describe separate radiation sources for each side being pumped.

When a laser is used as the transverse pumping source, the pumping laser beam is directed onto the laser active medium usually from one side only. If the pumping laser beam is larger in cross section than the size of the laser active medium to be pumped, the pumping laser beam is generally focused down to a suitable smaller size. Generally the dye solution is so concentrated that no pumping light passes through. However, one known prior art configuration does apparently allow some transverse pumping light to pass through the dye solution because there is a curved surface mirror of some kind on the other side apparently for the purpose of reflecting back to the dye solution any of the focused pumping radiation which passes through the dye solution. All of these prior art laser pumping schemes which use a laser as the pumping source produce non-uniform pumping of the laser active medium.

DISCLOSURE OF INVENTION

A right angle corner reflector is used to reflect different parts of a single incident collimated radiation beam such that a defined region (preferably cylindrical) is equally irradiated transversely from four directions. The irradiated region is positioned such that the irradiated region does not intercept incident rays from striking the intersection of the corner reflector surfaces. The irradiated region is spaced from the corner reflector such that one quarter of the radiation incident upon the cylindrical region strikes the region directly, one quarter is first reflected from one of the corner reflector surfaces, one quarter is first reflected from the other corner reflector surface, and one quarter is reflected from first one and then the other corner reflector surface before striking the cylindrical region.

In a preferred embodiment, this structure is used to transversely pump a cylindrical volume of dye solution uniformly. In this embodiment, the right angle reflector is preferably constructed as a prism having a longitudinally oriented hole as the irradiated region through which the active laser medium is flowed.

This structure may be used also in other applications such as in solar radiation collection.

BRIEF DESCRIPTION OF THE DRAWINGS

The details of this invention will now be described in connection with the accompanying drawings, in which.

BEST MODES FOR CARRYING OUT THE INVENTION

Figure 1:
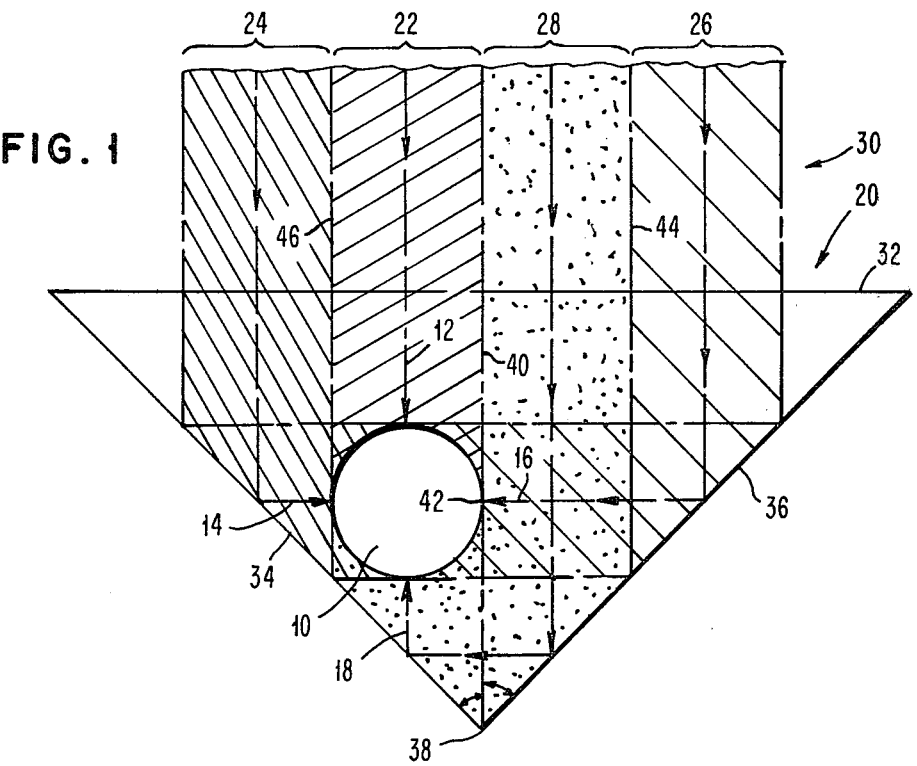
FIG. 1 is a cross-sectional view of a prism reflector having a longitudinal cavity positioned in accordance with this invention.

Referring now to FIG. 1, a cylindrical region 10 is transversely irradiated from four directions 12, 14, 16 and 18 by different portions 22, 24, 26, 28 respectively of a single radiation beam 30. Cylindrical region 10 is a longitudinally oriented round hole within a right angle prism structure 20. Prism 20 is fabricated from any suitable material which is not affected adversely by the incident beam 30 and which is substantially transparent to beam 30. Fused silica is a suitable material for prism 20 when the incident beam is ultraviolet or visible light, for example. Hole 10 may be formed by drilling, for example. The final prism configuration may be formed either before or after the hole is formed. Since prism 20 is used to internally reflect the incident beam 30, the relationship between the index of refraction of the prism and of the medium outside of the prism (ordinarily air) should be such that total internal reflection occurs at the reflection angles encountered and with the incident radiation used. It may be necessary to coat one or both of the reflecting surfaces with a suitable reflecting material if total internal reflection does not occur.

Portion 22 of incident beam 30 directly irradiates the top surface of region 10 without reflection. Portion 24 reflects from prism surface 34 and irradiates the left side surface of region 10. Portion 26 reflects from prism surface 36 and irradiates the right side surface of region 10. Portion 28 reflects first from prism surface 36 and then from prism surface 34 and finally irradiates the bottom side surface of region 10. It should be apparent that the four irradiated side surfaces of region 10 overlap each other.

In order for the single beam 30 to become suitably divided into the portions shown, it is necessary that the irradiated region 10 be properly sized and positioned within the prism. Obviously, region 10 cannot project above the top surface 32 of the prism. It is also necessary that ray 40 which is incident upon the intersection 38 of surfaces 34 and 36 also be tangent to a side surface of region 10. The point of tangency is indicated by reference numeral 42. The incident beam is preferably oriented such that it strikes both surfaces 34 and 36 at 45 degrees as shown. Region 10 is suitably spaced from surface 34 such that ray 44 which joins beam portions 26 and 28 is tangent to the bottom surface of region 10 after reflection from surface 36 of the prism. At this position, ray 46 which joins beam portions 22 and 24 is tangent to the left side surface of region 10. Beam portions 22, 24, 26 and 28 are all equal in width. It should be apparent that beam 30 could be wider than shown, but that any additional width would not contribute to the irradiation of region 10.

Figure 2:
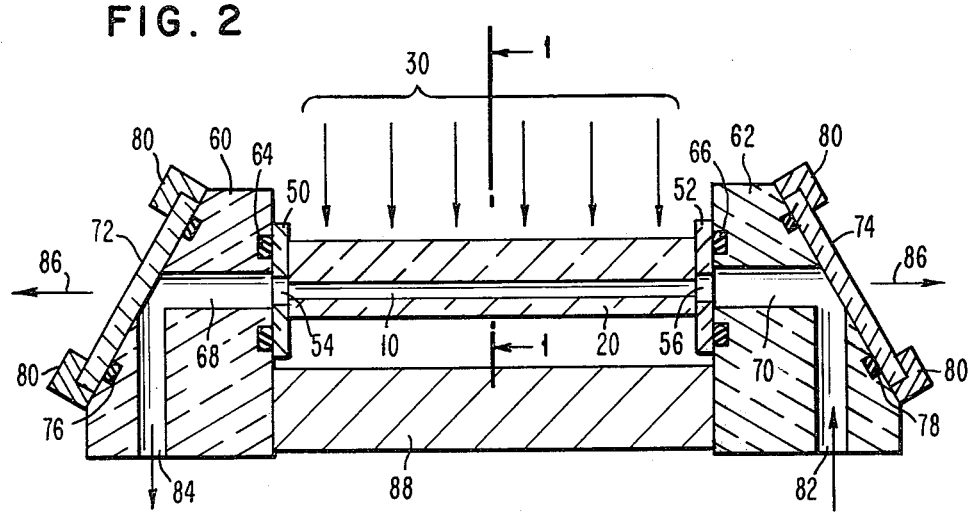
FIG. 2 is a cross-sectional view of a laser dye cell incorporating the prism reflector shown in FIG. 1.

FIG. 2 illustrates a laser dye cell structure which incorporates the prism structure 20 of FIG. 1. Fused silica spacers 50, 52 are sealed to prism 20 and have holes 54, 56 coaxially aligned with hole 10 of prism 20. Solder glass may be used to attach the spacers to the prism. End blocks 60, 62 are sealed to spacers 50, 52 respectively via O-rings 64, 66. The end blocks 60, 62 have passageways 68, 70 respectively which are aligned with hole 10. Windows 72, 74 are sealed to end blocks 60, 62 via O-rings 76, 78. The cell windows are held by clamping pieces 80 of any convenient design. Passageways 68, 70 are designed so that dye laser liquid may enter at opening 82, flow along passageway 70 through hole 56 of spacer 52, along hole 10, through hole 54 in spacer 50, and along passageway 68 to exit 84. Region 10 is pumped by radiation 30 and laser radiation 86 generated in region 10 exits through windows 72 and 74 as shown. Any suitable dye laser liquid may be used such as rhodamine or coumarin dye dissolved in ethanol. An ultraviolet laser is a suitable source for radiation beam 30. The whole assembly is held together by fastening end blocks 60, 62 to a suitable support 88.

Figure 3:
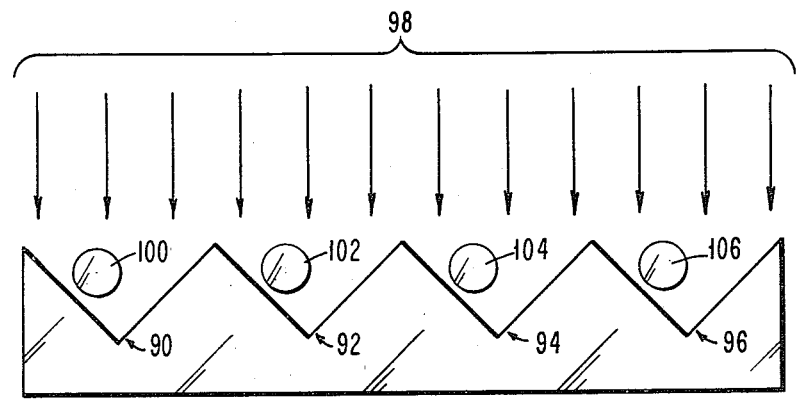
FIG. 3 illustrates in cross-section a solar collector constructed in accordance with the principles underlying this invention.

FIG. 3 illustrates another use of the principles of this invention. The right angle reflector structure is here replicated to form a linear array of right angle reflectors, 90, 92, 94, 96. Each has an associated cylindrical absorber region 100, 102, 104, 106, respectively. Incident radiation in this embodiment is sunlight 98. Regions 100, 102, 104, 106 are interconnected (not shown) and filled with a light absorbing medium. The result is a solar energy collector. A concentration factor of 4 is achieved using only right angle flat reflector surfaces. Flat surfaces are easier and more economical to construct than paraboloidal reflecting surfaces and the concentration factor is higher with the off-center positioning of the absorbers than with the conventional central positioning of absorbers.

Figure 4:
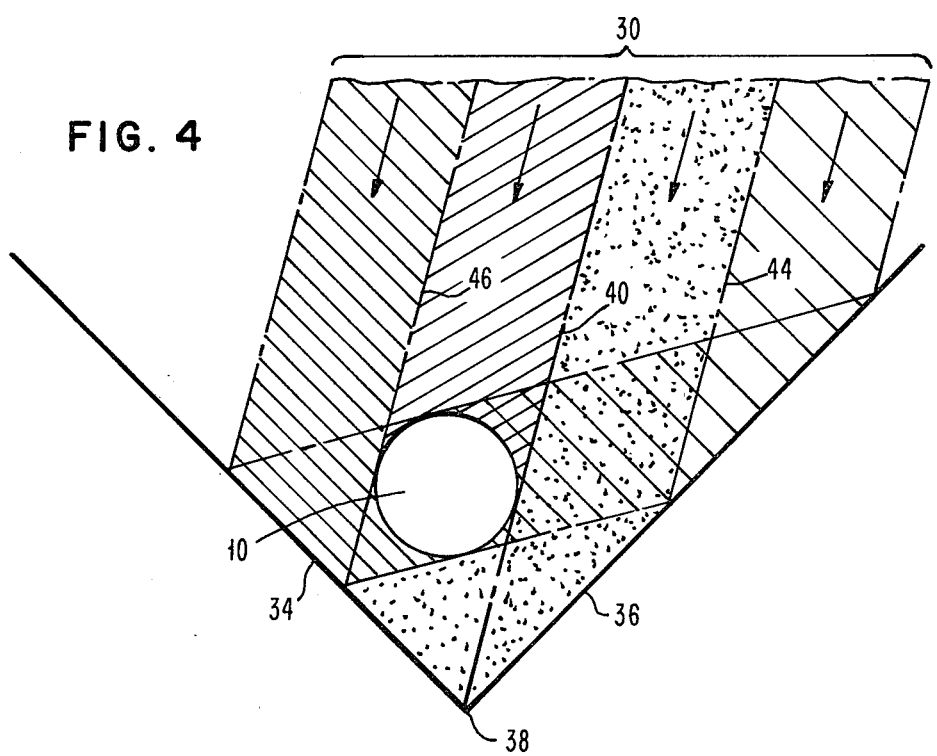
FIG. 4 shows in cross-section a corner reflector receiving oblique incident radiation and a cylindrical region positioned in accordance with this invention.

FIG. 4 shows that the principles of this invention also apply when the incident beam 30 strikes a right angle corner reflector at an oblique angle. Ray 40 again is tangent to region 10 and strikes the intersection 38 of reflecting surfaces 34, 36 as shown.

Figure 5:
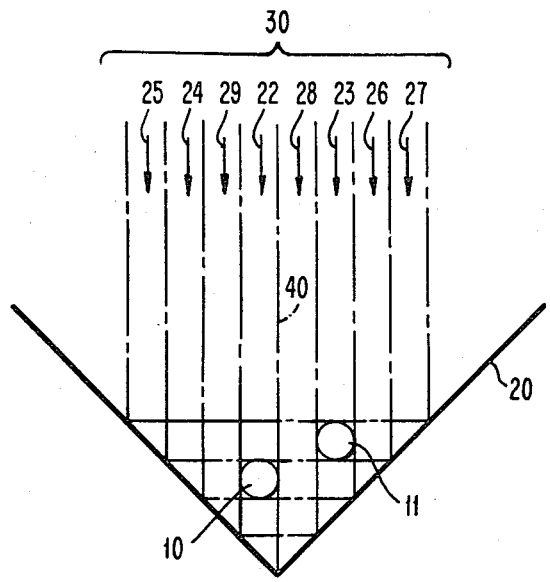
FIGS. 5 and 6 illustrate in cross-section corner reflectors in accordance with the present invention which have more than one irradiated cylindrical cavity.

FIG. 5 illustrates that it is possible to associate two cylindrical regions 10, 11 with the same corner reflector or prism 20. Both cylindrical regions can be irradiated from four sides by the same single beam 30. Portions 22, 24, 26, 28 illuminate the four sides of cylindrical region 10 while portions 23, 25, 27, 29 illuminate corresponding sides of cylindrical region 11.

Figure 6:
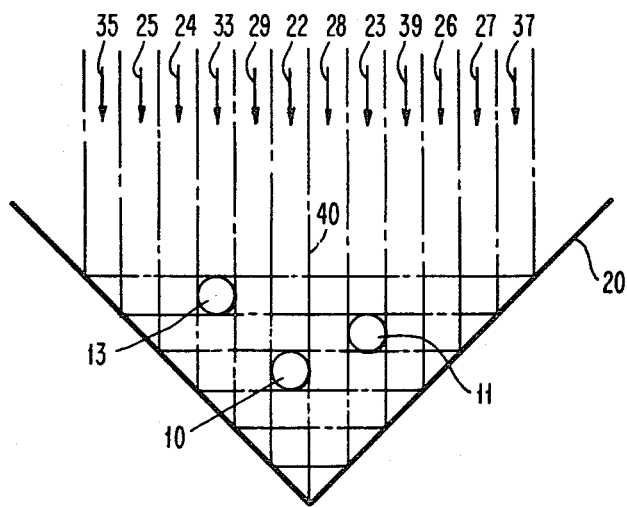

FIG. 6 shows that it is possible similarly to associate three cylindrical regions 10, 11, 13 with the same corner reflector or prism 20. In this embodiment, portions 33, 35, 37, 39 of beam 20 irradiate the top, left side, right side and bottom side, respectively of region 13.

It should be readily apparent that in general any number of cylindrical regions can be arrayed and associated with a single corner reflector of suitable size and all of the cylindrical regions can be simultaneously irradiated from four sides by the same single incident beam. A comparison of the positions of the irradiated regions in FIGS. 1, 4, 5 and 6 demonstrates that the position of an irradiated region is not uniquely determined. However, some general rules are apparent. For example, an irradiated region should not block rays from striking the intersection 38 of the corner reflecting surfaces or be too close to a reflecting surface. Otherwise, the bottom side of the region will not be uniformly irradiated. The irradiated region also should not project longitudinally or vertically beyond the corner space (geometrically a right angle triangular solid) defined by the corner reflector. Otherwise, side surfaces will not be uniformly irradiated.

Preferably, the rays which strike intersection 38 should be tangent to the irradiated region but this is not strictly necessary. When rays which reach intersection 38 are not tangent to the irradiated region, some portion of the incident beam does not reach the irradiated region. In the embodiments shown in FIGS. 5 and 6, for example, the irradiation which misses a particular non-tangent region, such as region 11 or 13, strikes instead one of the other regions. The radiation which misses a non-tangent region could be lost instead. This will necessarily occur, for example, when the irradiated region does not have a constant cross-section in the longitudinal direction. An elliptically shaped region of varying sized circular cross-section might be one example of such a region. Uniform four side irradiation would still occur but some of the incident radiation would be lost (at the regions of reduced cross-section).

Although the cross-section of the region to be irradiated has been shown as circular and preferably is circular, it should be apparent that the cross-section of the irradiated region can have many other possible shapes such as a square, or rectangle, a polygon, an ellipse or oval, etc. Also, the cross-sectional shape of the region can change in the longitudinal direction as well as the size. If the irradiated region has an axis, it is preferably parallel with the intersection of the corner reflector surfaces. It should be apparent that this is not strictly required either so long as the irradiated region does not block rays from reaching intersection 38, does not project beyond the region enclosed or defined by the corner reflector, and is not so close to a reflector surface that uniform bottom side irradiation is prevented thereby.

Further modifications and other embodiments should also be apparent to those of ordinary skill in this art and may be made without departing from the spirit and scope of this invention.

Having thus described my invention, what I claim as new and desire to secure by Letters Patent is:

1. Apparatus for transversely irradiating a region equally from four directions using a single incident beam of substantially collimated radiation, comprising:
   perpendicular reflective planes having a common edge and defining a corner region therebetween, said corner region being the region defined by all straight lines extending from one of said reflective planes to the other; and means defining an irradiated region entirely within said corner region, said irradiated region being suitably positioned within said corner region such that said irradiated region does not intercept any ray of incident radiation from striking said common edge, said irradiated region being directly irradiated from a first direction by incident radiation, said irradiated region also being simultaneously indirectly irradiated from a second direction by incident radiation reflected from one of said planes, said irradiated region also being simultaneously indirectly irradiated from a third direction opposite said second direction by incident radiation reflected from the other one of said planes, and said irradiated region being also simultaneously indirectly irradiated from a fourth direction opposite said first direction by incident radiation reflected from both of said planes.

2. Apparatus as defined in claim 1 wherein said irradiated region is cylindrical.

3. Apparatus as defined in claim 2 wherein said first and second directions are perpendicular to each other.

4. Apparatus as defined in claim 3 wherein said perpendicular reflective planes are surfaces of a prism.

5. Apparatus as defined in claim 4 wherein said cylindrical region to be irradiated is defined by a longitudinally oriented hole through said prism.

6. Apparatus as defined in claim 5 wherein said longitudinally oriented hole through said prism is filled with laser dye solution, said apparatus forming part of a dye laser cavity.

7. Apparatus as defined in claim 2 wherein said cylindrical region is solar radiation absorbing and said substantially collimated incident radiation is sunlight.

8. Apparatus as defined in claim 2 wherein said incident beam is a laser beam.

9. Apparatus as defined in claim 2 and further comprising at least one additional cylindrical region to be irradiated, said at least one additional cylindrical region being similarly transversely irradiated equally from four directions by the same single incident beam of radiation.

* * * * *